US012537876B2

(12) United States Patent
Heller et al.

(10) Patent No.: US 12,537,876 B2
(45) Date of Patent: Jan. 27, 2026

(54) ADJUSTING THE DATA TRANSMISSION FROM A CONTROL DEVICE TO A CLOUD SYSTEM BY MEANS OF MACHINE LEARNING

(71) Applicant: WAGO Verwaltungsgesellschaft mbH, Minden (DE)

(72) Inventors: Michael Heller, St. Georgen (DE); Raphael Goj, St. Georgen (DE); Josha Dittgen, Furtwangen im Schwarzeald (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 18/110,697

(22) Filed: Feb. 16, 2023

(65) Prior Publication Data

US 2023/0224366 A1     Jul. 13, 2023

Related U.S. Application Data

(63) Continuation of application No. PCT/EP2021/063483, filed on May 20, 2021.

(30) Foreign Application Priority Data

Aug. 18, 2020   (DE) ..................... 10 2020 005 055.7

(51) Int. Cl.
*G06F 15/16*      (2006.01)
*H04L 67/125*     (2022.01)
(52) U.S. Cl.
CPC .................................. *H04L 67/125* (2013.01)
(58) Field of Classification Search
CPC ..................................................... H04L 67/125

USPC .......................................................... 709/217
See application file for complete search history.

(56) References Cited

U.S. PATENT DOCUMENTS

| 7,735,060 B2 * | 6/2010 | Harvey ............... G06F 9/44521 |
| | | 714/38.14 |
| 8,237,587 B2 * | 8/2012 | Fukumura ................ H04Q 9/00 |
| | | 713/153 |
| 8,302,145 B2 * | 10/2012 | Levine ............... H04N 21/2393 |
| | | 725/151 |

(Continued)

FOREIGN PATENT DOCUMENTS

| DE | 103 17 563 A1 | 11/2004 |
| EP | 3 249 481 B1 | 10/2019 |

OTHER PUBLICATIONS

International Search Report for PCT Application No. PCT/EP2021/063483 dated Jul. 9, 2021 with English translation.

(Continued)

*Primary Examiner* — Alicia Baturay
(74) *Attorney, Agent, or Firm* — Muncy, Geissler, Olds & Lowe, P.C

(57) ABSTRACT

A method for adjusting the data transmission from an industrial control device to a cloud system, the method comprising steps carried out by a cloud application, the steps comprising: determining usage behavior by means of machine learning, by the cloud system or an associated computer system connected thereto, of data, more particularly process data, transmitted from the industrial control device; and sending at least one command to the industrial control device in order to adjust the data transmission.

10 Claims, 4 Drawing Sheets

(56) References Cited

U.S. PATENT DOCUMENTS

| | | | | |
|---|---|---|---|---|
| 8,973,079 | B2* | 3/2015 | Levine | H04N 21/6377 |
| | | | | 725/139 |
| 9,413,852 | B2* | 8/2016 | Lawson | G06F 1/14 |
| 9,769,535 | B2* | 9/2017 | Levine | H04N 7/173 |
| 9,821,766 | B2* | 11/2017 | Gaskin | B60R 25/1001 |
| 10,012,766 | B2* | 7/2018 | Modi | G01V 1/30 |
| 10,353,348 | B2 | 7/2019 | Verma | |
| 10,478,373 | B2* | 11/2019 | Duan | A61H 23/0263 |
| 10,500,127 | B2* | 12/2019 | Duan | A61H 23/02 |
| 10,834,474 | B2* | 11/2020 | Levine | H04N 7/173 |
| 11,477,083 | B2* | 10/2022 | Miller | H04L 67/1097 |
| 11,513,878 | B2* | 11/2022 | Kulaga | G06F 11/3452 |
| 11,561,522 | B2* | 1/2023 | Cooley | G05B 19/054 |
| 11,568,095 | B2* | 1/2023 | Delaney | G06F 21/554 |
| 11,599,392 | B1* | 3/2023 | Huang | G06V 10/17 |
| 11,627,114 | B2* | 4/2023 | Thomas | H04L 63/029 |
| | | | | 726/11 |
| 11,676,061 | B2* | 6/2023 | Banerjee | G06N 20/00 |
| | | | | 208/89 |
| 11,799,733 | B2* | 10/2023 | Uskudar | H04L 41/147 |
| 11,940,770 | B2* | 3/2024 | Cooley | G05B 19/054 |
| 11,943,205 | B2* | 3/2024 | Thomas | H04L 63/108 |
| 12,019,790 | B2* | 6/2024 | Delaney | H04M 1/72448 |
| 12,107,835 | B2* | 10/2024 | Thomas | H04L 63/029 |
| 12,107,836 | B2* | 10/2024 | Thomas | H04L 63/0218 |
| 12,113,777 | B2* | 10/2024 | Thomas | H04L 63/029 |
| 2008/0094181 | A1* | 4/2008 | Lenevez | G08C 17/02 |
| | | | | 341/176 |
| 2013/0212420 | A1 | 8/2013 | Lawson et al. | |
| 2020/0160207 | A1 | 5/2020 | Song et al. | |
| 2020/0277759 | A1* | 9/2020 | Kinoshita | E02F 9/18 |
| 2024/0378984 | A1* | 11/2024 | Shaffett | A61C 19/02 |
| 2024/0420159 | A1* | 12/2024 | Guo | G08G 1/0145 |

OTHER PUBLICATIONS

Koychev et al., "Adaptation to Drifting User's Interests," at https://www.researchgale.net/publication/2948694_Adaptation_to_Drifting_User's_Interests, pp. 1-8 (Aug. 1, 2004).

* cited by examiner

ADJUSTING THE DATA TRANSMISSION FROM A CONTROL DEVICE TO A CLOUD SYSTEM BY MEANS OF MACHINE LEARNING

This nonprovisional application is a continuation of International Application No. PCT/EP2021/063483, which was filed on May 20, 2021, and which claims priority to German Patent Application No. 10 2020 005 055.7, which was filed in Germany on Aug. 18, 2020, and which are both herein incorporated by reference.

BACKGROUND OF THE INVENTION

Field of the Invention

The present invention relates to the field of automation technology and in particular methods and techniques for efficient data transmission from an industrial control device to a cloud system and/or a remote computer, for example, a web application.

Description of the Background Art

In the course of the fourth industrial revolution and the all-pervasive digitalization, especially in industrial automation technology, cloud solutions are increasingly being used to analyze, manage, and partly even control the components of the automation environment.

In this case, data is generated by industrial control devices at runtime and sent to one or more cloud systems. For example, an industrial control device may be a programmable logic controller (PLC). Such a device is typically communicatively connected with one or more sensors and/or actuators and implements tasks in the context of automation technology.

A cloud system may generally comprise a computer system remote from the control device in the context of the invention. Examples include the WAGO Cloud, Microsoft Azure, Amazon AWS ("Amazon Web Services"), the SAP Cloud or the IBM Cloud. Within the cloud system, the received data is stored, evaluated and/or made available to users for any mobile terminal. The connection of the control devices to the cloud system or systems can be wired or wireless (e.g., via mobile technology).

The devices within the automation environment, such as the industrial control devices mentioned above, are often referred to as edge devices in this context. An edge device is generally understood to be a device which is connected to a remote computer system, in particular a cloud device, which nonetheless performs local and thus decentralized data processing, for example to prepare data prior to transmission to the cloud or the remote computer system.

Which data an industrial control device is to send to the cloud system is typically defined programmatically by a (PLC) developer in the control device, for example in the PLC program. In other words, the data to be transmitted is typically selected and determined at development time. However, the actual use of the data within the cloud system is typically not determined by the (PLC) developer, but by the cloud user(s), for example by dashboard elements being created, alarm rules defined, trends created, exports carried out, or the like. Which of the data supplied by the industrial control device will then be used accordingly within or outside the cloud system is not necessarily known at the time the data transmission is defined. It is also conceivable to subsequently adjust the definition of the data transmission by selecting a user via an appropriate application that adjusts the selection within the control device.

However, these procedures are inflexible, and it is laborious to change the data and/or transmission characteristics to be transmitted. In particular, the first-mentioned previously known methods often also transmit data which are not used in the cloud system and are therefore unnecessary. The transmission of unnecessary data and its storage within the cloud system can cause a sometimes considerable consumption of resources and thus high costs.

This is because the sending of data from industrial devices to cloud systems and the data connection required for this is associated with negative factors. For example, data transmission in an industrial context is often associated with usage-related costs, i.e., the more data to be transmitted, the more expensive this can be. The costs result, for example, from the resulting traffic and/or the number of incoming messages into the cloud system. Furthermore, the data transmission rate is often physically limited, which means that not just any amount of data can be transmitted. The more devices share a connection, the lower the possible data transmission rate. Especially in the context of the internet, but also the intranet, a data connection may also be affected by downtime.

In another technical field, namely the operation of mobile networks, it is known for example from DE 103 17 563 A1, to adjust the menu items or menu navigation of a mobile communications portal to the individual usage behavior of mobile users. In this case, a menu-controlled mobile communications portal is transmitted via the cellular network from a central unit to the mobile terminals and operated locally there. The central unit evaluates which menu items are chosen, how often, at what time or at which location on the mobile terminals, whereby user profiles can be created, and the mobile communications portal can be individually adapted. Such a concept, in which user behavior is recorded on the local mobile terminals, however, is useless for the present invention, since, as explained above, in the industrial context, it is not the users of the local control devices, but rather the users of the remote cloud system who decide which data are ultimately relevant.

SUMMARY OF THE INVENTION

It is therefore an object of the present invention to provide a method for more efficient data transmission from an industrial control device to a cloud system which at least partially overcomes the disadvantages of the prior art mentioned above.

Thus, in an exemplary embodiment, a method is provided for adjusting the data transmission from an industrial control device to a cloud system, the method comprising the following steps carried out by a cloud application: Determining usage behavior by means of machine learning, the usage behavior relating to the use, by the cloud system or an associated computer system connected thereto, of data, more particularly process data, transmitted from the industrial control device; and sending at least one command to the industrial control device in order to adjust the data transmission.

A basic idea is therefore to use machine learning within the cloud system to learn (preferably regular or recurring) usage behavior of users (or several users or user behaviors) in respect of the usage of the data supplied by the control device and to adjust the data transmission based on this and/or to optimize it step by step. This can reduce the transmission and storage of data within the cloud system.

This reduction helps to save resources within the cloud system. Furthermore, traffic is reduced with regard to the data connection, which is particularly advantageous in particular in the industrial context and/or with mobile connections.

The determined usage behavior may comprise a set of values which, for example, represent at least one frequency of use, at least one duration of use and/or at least one time of use. These parameters (i.e., the frequency of use, duration of use, time of use, etc.) are preferably based on inputs by one or more users, wherein the inputs may directly and/or indirectly affect the parameters. Such user input can be of a varied nature, e.g., manual mouse input, keyboard input, voice input, input via eye tracking, opening an application, clicking a button, etc.). The parameter may be determined, for example, from login times, an access time and/or access duration to projects, dashboards, functions (e.g., for export), etc., and/or mouse interactions.

In addition, or alternatively, the determined usage behavior may also include at least one type of use. This can be determined, for example, by analyzing whether the associated data are used in alarms (these data are preferably always sent), dashboards, trends, and/or for exports (e.g., to other systems).

The at least one command for adjusting the data transmission may be a command for selecting a subset of the data for transmission, for non-sending of specific data, for redirecting specific data to another data store, for sending data aggregates, in particular minimum values and/or maximum values, for adjusting a time interval, in particular a sampling rate and/or publishing rate, of specific data, and/or for grouping data. By using the adjustments or combinations of the latter, far-reaching cost-benefit optimization can be achieved. Preferably, a command in this case is a command which is automatically generated and then sent to the control device, where it is implemented such that the data transmission is adjusted according to the command, for example by adaptation in the PLC program or by changing control device-side configurations.

Preferably, the usage behavior can be determined over a predetermined period of time, for example over a period in which several direct and/or indirect inputs, interactions, etc. take place. The method may also include the creation of a predictive model for the future use of the data, for which the at least one command for adjusting the data transmission based on the predictive model is used. Preferably, the usage behavior is determined continuously or regularly. The usage behavior may refer to the use of the data by one or more users or a group of users.

In a further aspect of the invention, the control device may comprise an OPC server, preferably an OPC UA server, and/or the computer system may comprise an OPC client, preferably an OPC UA client.

The methods described may also include receiving data from the industrial control device without an initial selection of the data on the industrial control device having been made. In this case, the control device initially sends all its available data to the cloud system, so that the cloud system can then perform the above-described optimizations of the data transmission.

Furthermore, in a further aspect, all or some data generally available in the control device can be manually selected again, e.g., via a web application. As a result, data can be accessed at any time, which the system may have automatically deselected. Depending on the configuration, these data may also be cached on the control device or another system.

The invention further relates to a system for adjusting the data transmission of an industrial control device to a cloud system, wherein the system is configured to perform the methods described above. In addition, a computer program is provided with commands for implementing the method described above.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following, currently preferred exemplary embodiments of an inventive system and method for efficient data transmission between an industrial control device and a cloud system are explained in more detail. The term "industrial" is to be understood in general terms and is not limited to classic manufacturing systems. Rather, an application, for example in the context of building automation, is also conceivable and sensible.

System Overview

Figure 1:
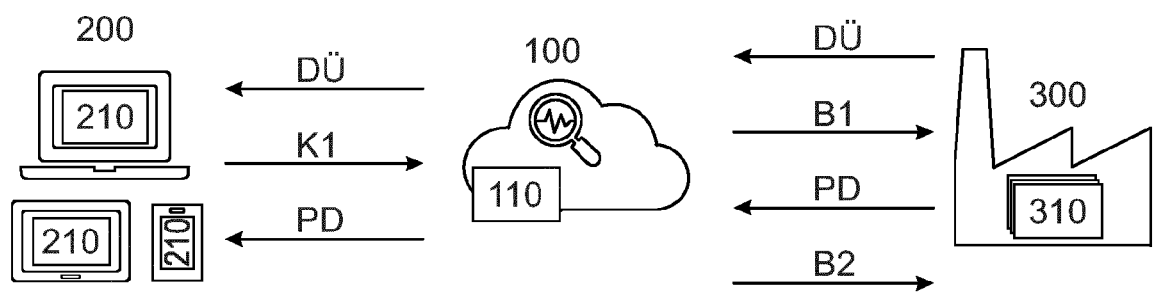
FIG. 1 is a schematic representation of a system environment for embodiments of the invention.

FIG. 1 shows an exemplary system environment for a method for adjusting a transmission of process data PD between a device 310 of an automation system 300 and a first computer system 100. The device 310 of the automation system may be an industrial control device, such as a programmable logic controller (PLC), an industrial PC (IPC), an IoT gateway, an edge controller, etc. The process data PD are generated or delivered as usual during the execution of a technical process (not shown in FIG. 1) and collected via the device 310.

The device 310 of the automation system may include an OPC UA server. OPC UA (Open Platform Communications—Unified Architecture) is a standard for data exchange as a platform-independent, service-oriented architecture (SOA) and has the ability to transport machine data and describe it semantically in machine-readable form.

The first computer system 100 is in particular a cloud system (e.g., in the form of a public cloud and/or private cloud), which originally includes one or more computers or servers. Alternatively, the first computer system 100 may also be comprised of one or more "normal" computers or servers, which are operated locally (e.g., as part of the automation system 300) or at a remote location. Combinations are also conceivable.

Examples are shown below for simplicity only with respect to an industrial control device 310 and a cloud system 100. It should be emphasized, however, that aspects of the invention can also be used in other types of devices and systems, as explained above.

The industrial control device 310 of the automation system 300 and the cloud system 100 are connected to each other via a corresponding network system and exchange process data PD in normal operation. In particular, process data PD are transmitted from the control device 310 to the cloud system 100. The process data PD are values, signals and/or information, which arise in particular during the operation of sensors and/or actuators which are connected to the control device 310. This is particularly the case in the context of automation technology, where a large number of such data are continuously created. Data in the context of the invention are meant to be both data at a specific point in time, as well as time series, i.e., temporal sequences of data.

The control device 310 may include a control application which processes the process data PD as input and generates corresponding outputs. Furthermore, a portion of the control application may be tasked with the transmission of process data defined in the control application PD to the cloud system 100. This portion of the control application may also be separate from the rest of the control device 310.

The cloud system 100 may comprise a cloud application 110, for example in the form of the WAGO Cloud. The cloud application 110 may include, among other things, user management, project management, device management, an alarm management system, dashboards, trends and/or export functionalities.

In some embodiments, a data point overview DU can also be used. This preferably comprises the data points available to the control device 310. In particular, a data point can include a key and a value, e.g., "Sensor_UG12=20.0".

Furthermore, the example according to FIG. 1 comprises further computer systems (such as the second computer system 200 in FIG. 1), which can be provided as arbitrary mobile terminals (e.g., desktop PC, laptop, smartphone, tablet, mixed reality devices, etc.). A second computer system 200, hereinafter also referred to as the client system, may include, inter alia, an OPC UA client.

The client system 200 and the cloud system 100 are connected to each other via a corresponding network system and exchange data in normal operation. In particular, requests are made from a client application 210 running on the client system 200 to the cloud system 100 and the cloud system 100 responds according to the request with a response (see request-response methodology). The client application 210 may in particular be a web application which runs, for example, in a web browser. The WAGO Cloud, for example, provides such a web application.

Analysis of Usage Behavior by Means of Machine Learning

Using approaches, methods and/or algorithms of so-called "machine learning", embodiments of the invention make a prediction based on one or more usage behaviors with regard to the use of the process data PD, in respect of which process data PD the user or users will really need.

For this purpose, the cloud application 110 preferably comprises a machine learning system (which can also run in another cloud system in alternative embodiments). Based on the process data PD and the actual usage behavior within the cloud application 110 or the cloud system 100 and/or the computer system 200, the usage behavior of the users with regard to the use of data is analyzed. The usage behavior can be determined in particular from information on the frequency of use, the duration of use and the time of use of the process data PD. Thus, the usage behavior is determined in a preferred embodiment of the invention based on the actions (and related requests) within the client application 210 on the client system 200 and/or the related actions within the cloud system 100. For example, an alarm is defined in the client application 210 (e.g., by means of a rule), but the alarm rule is constantly evaluated within the cloud system 100 and, if the alarm is triggered, e.g., also forwarded to external systems (e.g., via text, email, etc.).

Figure 2:
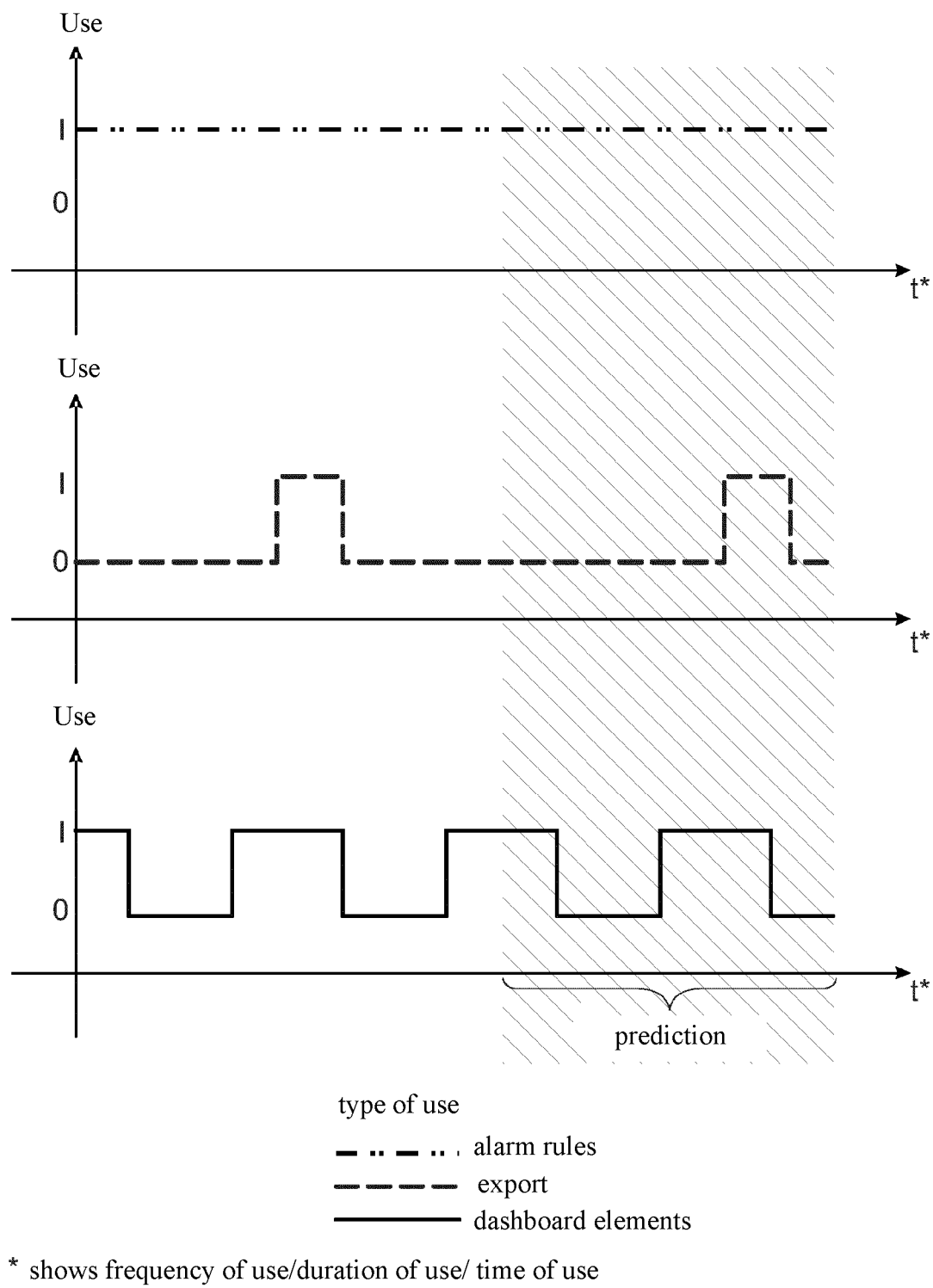
FIG. 2 shows examples of recorded usage behavior and the prediction of the expected usage behavior according to embodiments of the invention.

Based on the usage behavior, a prediction regarding the expected usage behavior can be generated. FIG. 2 shows examples of recorded usage behavior and the prediction of expected usage behavior.

Machine learning is considered a branch of "artificial intelligence". A well-known approach in the context of machine learning are so-called "neural networks". The process of machine learning to determine the usage behavior may be formed in some embodiments of the invention of several process steps, which are shown by way of example in FIG. 3. For example, after preprocessing (S100—e.g., combining several data into vectors), the resulting data serve as input into a neural network (S200) and the outputs from it can be further combined or contextualized in a further step (S300). Even approaches with only some of the steps described above are conceivable.

Figure 4:
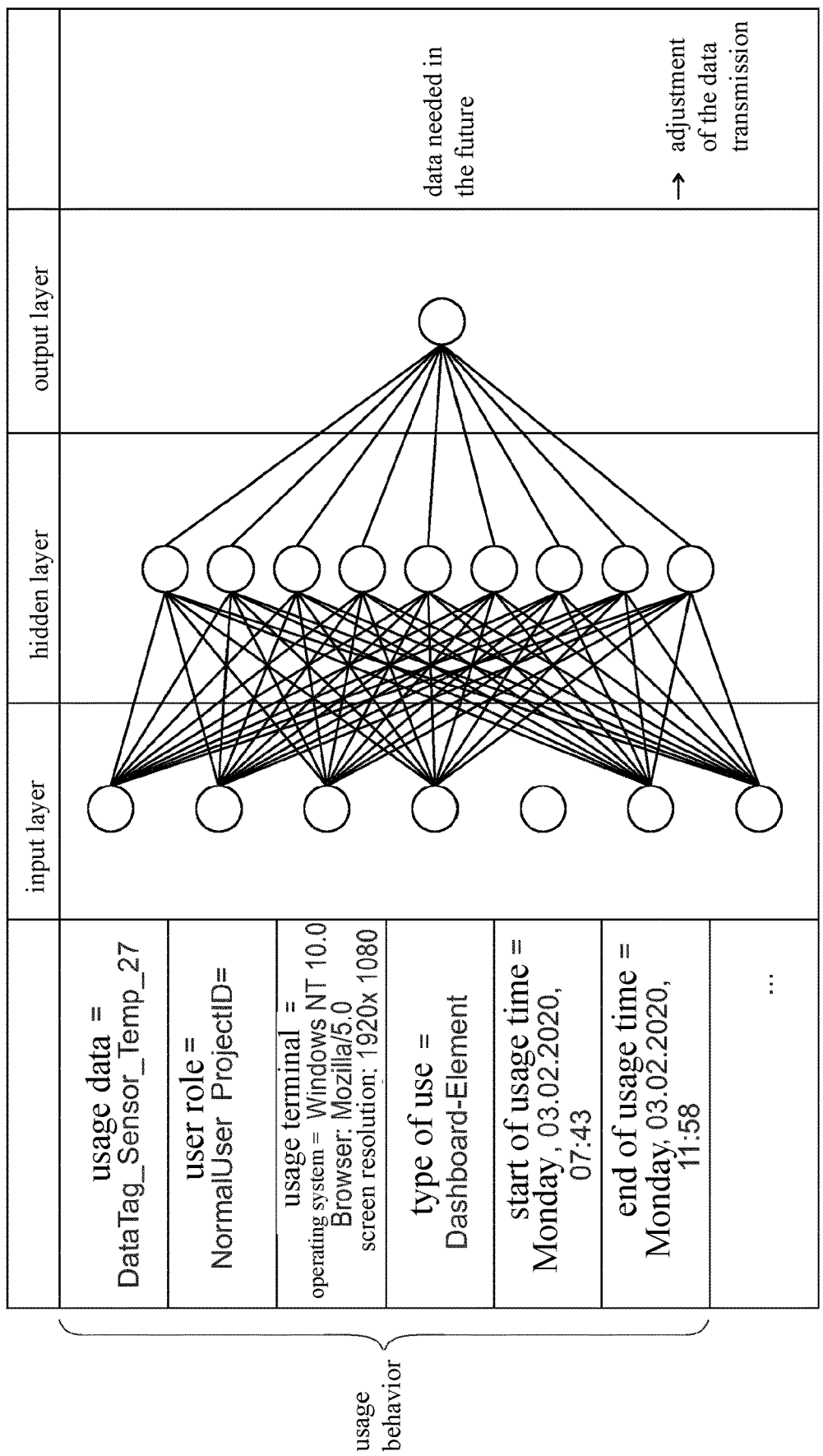
FIG. 4 illustrates an exemplary neural network according to embodiments of the invention.

As a highly simplified example, FIG. 4 shows a structure of a neural network. A neural network usually comprises a large number of interconnected artificial neurons. These are usually arranged in layers. The layer that receives the input data is called the input layer. The output layer produces the output. There can be any number of other layers—so-called hidden layers—between the input and output layers. Each neuron now produces an individual output that depends on the respective input and the internal activation function of the neuron. All outputs of a layer are forwarded as inputs for the next layer, wherein each link can transmit the information to different degrees. The strength of each individual link is determined during generation and training by a special learning algorithm (e.g., back propagation)

In examples of the invention, the usage behavior can be determined, for example, based on a wide variety of user information and subsequently analyzed, i.e., which data are requested or used at what time, for how long or in what context, and who requests or uses them. This information may be collected through the use of the client application 210 and the associated requests and actions of the cloud system 100.

Figure 3:
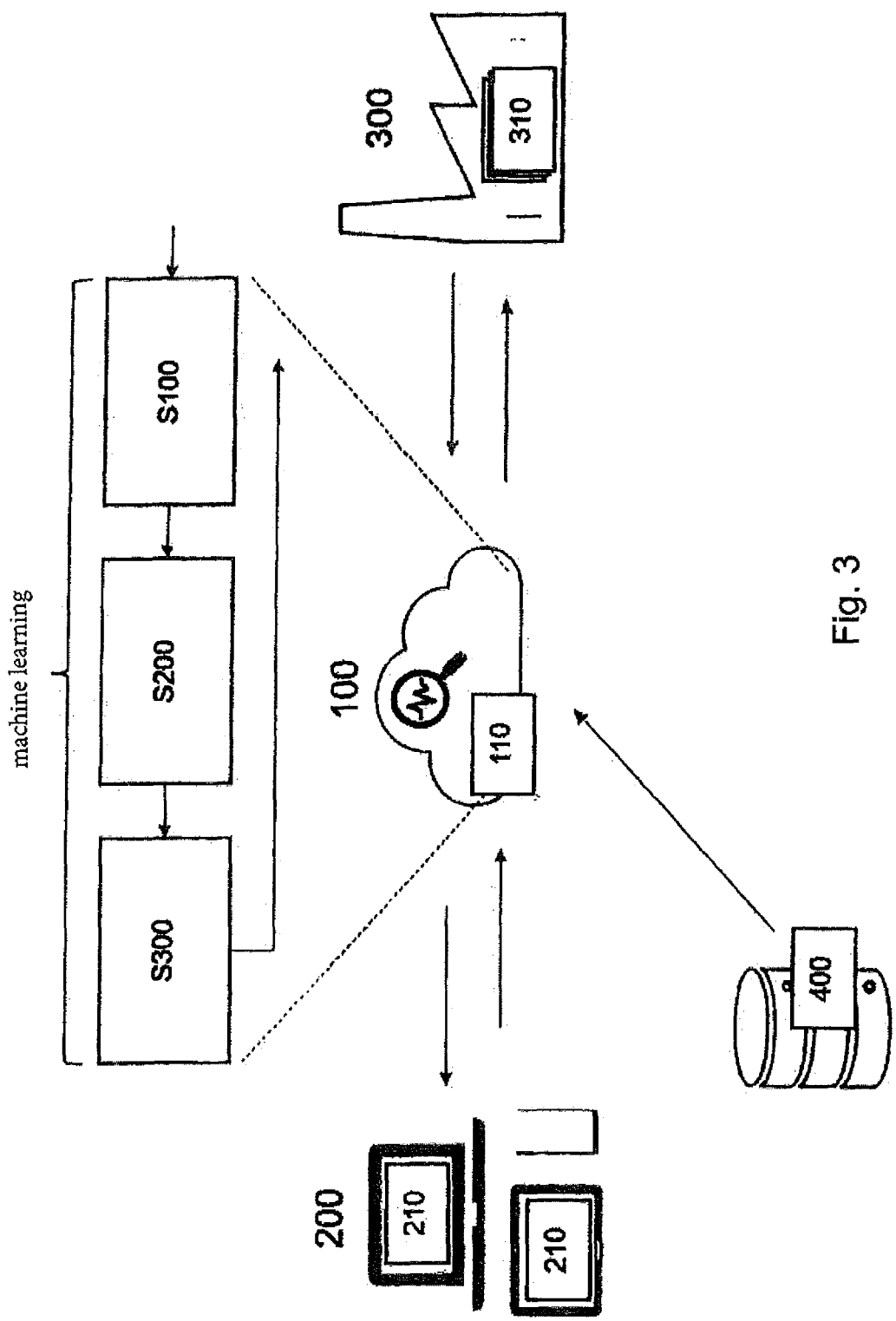
FIG. 3 shows the system overview from FIG. 1 shown with an enlarged cloud system and machine learning system according to embodiments of the invention.

Furthermore, with regard to user behavior, external data from external data sources 400 can also be used (see FIG. 3). These can be, for example, calendar information from which relevant knowledge can be derived (e.g., the person or user may be on vacation in the near future and therefore does not need process data PD, but only a summary after the vacation).

Adjustment of the Data Transmission

On the basis of the learned usage behavior and/or the expected usage behavior, the data transmission between the control device 310 and the cloud system 100 can be adjusted, in particular iteratively. The adjustment of the data transmission can be carried out using commands or new configurations, which are sent from the first cloud system 100 to the control device 310. The latter can be used, for example, to adjust the setting of a PLC program with regard to data transmission or to change the configuration of the data transmission of an OPC UA server.

The data transmission may be adjusted in particular by defining the so-called sampling rate, defining the publishing rate, determining a storage location, determining the data points to be transmitted and/or determining possible preprocessing (e.g., formation of aggregate values). Due to such adjustments, for example, values of individual data points are no longer sent, specific data points are "redirected" to another memory, only aggregates, min. values, max. values, etc. are sent, the time interval is adjusted and/or data are grouped according to usage and sent together.

In an example, there is no definition at all of those data points which are to be transmitted to the cloud system 100, in the control device 310. Instead, all data collected by the control device 310 are initially transmitted to the cloud system 100 and the system then (after some time) adjusts the data transmission such that only the required data is transmitted at the necessary time, as described above.

Exemplary Application: Use of the WAGO Cloud for Facility Management of a Server Room With regard to access control to the server room, the responsible facility manager has defined an alarm rule within the WAGO Cloud, which sends a notification to the facility manager in the event of an unauthorized access attempt. From the usage behavior or the type of use (alarm), the system has learned that the data of the access control are required around the clock and thus must be sent continuously from the control device.

To track the total power consumption of the servers in the server room, the facility manager uses a trend within the WAGO Cloud. The system has learned from the facility manager's usage behavior that data for the trend are only needed once a month to create a report and it is therefore sufficient to summarize the data as daily aggregates on the control device and send them to the cloud system.

For the monitoring of several operating states in a server room, the facility manager uses a dashboard with multiple dashboard elements. The system has learned from the facility manager's usage behavior that data for the dashboard elements must only be sent to the cloud system from Monday to Friday between 8 a.m. and 4 p.m.

FURTHER EXAMPLES

Provided is a method for adjusting a transmission of process data (PD) of an automation system (300) between a device of an automation system (310) and a first computer system (100), wherein at a first time the method comprises the following steps: sending of a data point overview (DÜ), preferably determined by the connected sensor/actuator, from the device of the automation system (310) to the first computer system (100); provision of the data point overview (DÜ) by the first computer system (100) to a second computer system (200); collection of the required data points from the data point overview (DÜ) on the second computer system (200) in a collection result, wherein the collection of the required data points is done by using the data points within a second application (210); transmission of the collection result in the form of a first configuration (K1) from the second computer system (200) to the first computer system (100); sending of a first command (B1) from the first computer system (100) to the device of the automation system (310) for the first adjustment of the transmission of process data (PD) according to the first configuration (K1); first adjustment of the transmission of process data (PD) according to the first configuration (K1) by the device of the automation system (310); transmission of the process data (PD) according to the first configuration (K1) between the device of the automation system (310) and the first computer system (100), wherein initially the transmission takes place in a transmission interval defined in the device of the automation system (310) and wherein the transmission interval is changeable in particular by means of the second application (210); optional sending of a request of correspondingly required data points by the second computer system (200) to the first computer system (100), wherein the request results from the use of the second application (210); transmission of the required process data (PD) from the first computer system (100) to the second computer system (200); and wherein at a further time, the method comprises the following steps: determining usage behavior of the data points within the second application (210) by a first application (110) on the first computer system (100), wherein the usage behavior is based on which data points are requested or required and/or when the data points are requested, and/or by which users the data points are requested, and/or within which functional context the data points are requested (e.g., for a dashboard element (diagram), for an alarm rule, for a trend view, for a data export, etc.; for example, when using a data point in an alarm rule, it must be ensured that the data points are sent in a very regular and fine-grained manner, otherwise an alarm cannot be triggered in time; in the case of a trend view, however, this is not necessary), and/or within which project context the data points are requested; deriving a second configuration based on the usage behavior (K2) by the first application (110), wherein the second configuration (K2) comprises a selection of the required data points and associated transmission intervals, which defines the future process data to be transmitted (PD) and their transmission intervals; sending a second command (B2) from the first computer system (100) to the device of the automation system (310) for the second adjustment of the transmission of process data (PD) according to the second configuration (K2).

Wherein the determination of the usage behavior and the derivation of the second configuration based on the usage behavior (K2) takes place by means of machine learning.

Wherein the second configuration (K2) includes commands (B2) for handling process data (PD) on the device of the automation system (310), Wherein the commands in particular comprise instructions for the temporal transmission of the process data (PD) and/or instructions for process data aggregation and/or instructions for process data preprocessing and/or instructions for time series smoothing.

Wherein the device of the automation system (310) comprises an OPC UA server.

Wherein the first computer system (100) and/or the second computer system (200) comprises an OPC UA client.

Wherein the machine learning is carried out by means of a neural network.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for adjusting data transmission, via a cloud application, from an industrial control device to a cloud system, the method comprising:
   determining usage behavior via machine learning, the usage behavior comprising a set of values that represent the use, by the cloud system or an associated computer system connected thereto, of data or process data transmitted from the industrial control device; and sending at least one command to the industrial control device in order to adjust the data transmission, wherein the at least one command for adjusting the data transmission is a command for at least one of:
the selection of a subset of data for transmission;
non-sending of specific data;
redirection of specific data to another data store; or
grouping of data.

2. The method according to claim 1, wherein the determined usage behavior comprises at least one frequency of use, at least one period of use, at least one time of use and/or at least one type of use.

3. The method according to claim 1, wherein the at least one command for adjusting the data transmission further includes at least one of:
sending of data aggregates that include minimum values and/or maximum values; or
adjustment of a sampling rate and/or publishing rate of specific data.

4. The method according to claim 1, wherein the usage behavior is determined over a given period of time, the method also comprising creating a predictive model for future use of the data.

5. The method according to claim 1, wherein the usage behavior is determined continuously or regularly.

6. The method according to claim 1, wherein the usage behavior refers to a use of the data by one or more users or by a group of users.

7. The method according to claim 1, wherein the industrial control device comprises an OPC server or an OPC UA server, and/or wherein the computer system comprises an OPC client or an OPC UA client.

8. The method according to claim 1, further comprising:
receiving data from the industrial control device without an initial selection of the data on the industrial control device having taken place.

9. A system for adjusting data transmission from an industrial control device to a cloud system, wherein the system is configured to perform the method according to claim 1.

10. A non-transitory computer readable medium storing a computer program with commands thereon that, when executed on a computer, cause the computer to carry out the method according to claim 1.

\* \* \* \* \*